United States Patent [19]

Gradl et al.

[11] 4,452,768

[45] Jun. 5, 1984

[54] PROCESS FOR REMOVING HEAVY METAL IONS FROM WET-PROCESSED PHOSPHORIC ACID

[75] Inventors: Reinhard Gradl, Hürth; Günther Schimmel, Erftstadt; Werner Krause, Hürth; Gero Heymer, Erftstadt, all of Fed. Rep. of Germany

[73] Assignee: Hoechst Aktiengesellschaft, Fed. Rep. of Germany

[21] Appl. No.: 455,252

[22] Filed: Jan. 3, 1983

[30] Foreign Application Priority Data

Jan. 28, 1982 [DE] Fed. Rep. of Germany ....... 3202658

[51] Int. Cl.³ .................. C01B 25/16; B01D 11/00; C01G 17/00; B03C 1/00
[52] U.S. Cl. .................................. 423/321 R; 423/24; 423/89; 423/100; 423/321 S
[58] Field of Search ............... 423/321 R, 312 S, 21.5, 423/22, 24, 49, 54, 87, 89, 100, 139, 63, 70, 10

[56] References Cited

U.S. PATENT DOCUMENTS 4,226,791 10/1980 Reinhard et al. ................ 423/54 X
4,256,570 3/1981 Allen et al. ................ 423/321 R X

FOREIGN PATENT DOCUMENTS 0016264 10/1980 European Pat. Off. .
0023195 1/1981 European Pat. Off. .
0023428 2/1981 European Pat. Off. ............. 423/54
791592 12/1980 U.S.S.R. ......................... 423/321 R Primary Examiner—Gregory A. Heller
Attorney, Agent, or Firm—Connolly and Hutz

[57] ABSTRACT

The disclosure relates to process for removing heavy metal ions, especially cadmium, copper, lead and mercury ions from wet-processed phosphoric acid. To this end, the crude acid is contacted with a mixture consisting of an adsorbent and a diorganyldithiophosphoric acid ester or, after treatment with the ester, the acid is contacted with the adsorbent alone, and the purified phosphoric acid is ultimately separated from the ester and adsorbent.

8 Claims, No Drawings

PROCESS FOR REMOVING HEAVY METAL IONS FROM WET-PROCESSED PHOSPHORIC ACID

The present invention relates to a process for removing heavy metal ions, especially cadmium, copper, lead and mercury ions from crude wet-processed phosphoric acid. Such acid is more particularly obtained by subjecting phosphate ore to processing treatment with sulfuric acid and separating resulting calcium sulfate. The acid contains a wide variety of cationic contaminants and, depending on the origin of the phosphate, relatively large proportions of dissolved, emulsified or suspended organic substances; the acid is also termed "black" acid in the art.

For certain uses, it is necessary to have phosphoric acid free from heavy metal ions, e.g. cadmium, copper, lead and mercury ions. The removal of heavy metals, especially cadmium, from crude phosphoric acid by precipitation by means of hydrogen sulfide is however a very expensive and technically difficult procedure. Since cadmium sulfide is soluble in phosphoric acid, it is necessary for it to be separated under specific conditions, i.e. under high pressure or at an increased pH-value (cf. Japanese Patent Specification JP-PS No. 7 575 115 and European Patent Application No. 0 023 195). Next, it is necessary for the acid to be successively freed from gas.

A further process provides for the heavy metals to be separated by subjecting the acid to liquid-liquid extraction. Difficulties associated with this process result from the fact that the metal ions are already contained in complex form, in the wet-processed phosphoric acid. Another process for the liquid-liquid extraction has been described in German Patent Application P No. 31 27 900.7, which provides for the heavy metals to be extracted from phosphoric acid, by means of a solution of a dialkyldithiophosphoric acid ester. A disadvantage encountered with this process resides in the need to use phosphoric acid which has been freed from emulsion-forming organic contaminants, i.e. prepurified. The liquid-liquid extraction is additionally rendered problematic by the fact that phase separation occurs very reluctantly only and that emulsified or dissolved dithiophosphoric acid ester is liable to be removed together with separated phosphoric acid so that it is generally necessary for the latter to be subjected to complementary after-treatment, i.e. to stripping.

As results, it is not possible for so-called "black" crude phosphoric acid to be satisfactorily purified by the processes described heretofore. The difficulties associated with unsatisfactory phase separation have long been known from the extraction of uranium from phosphoric acid, wherein it is invariably necessary for the acid to be prepurified, i.e. to be subjected to flotation, adsorption or similar treatment as described e.g. in European Patent Application No. 0 016 264.

The present invention now provides a process permitting wet-processed phosphoric acid to be freed in simple fashion by a one-step operation from heavy metal ions, especially cadmium, copper, lead and mercury ions, by contacting the phosphoric acid with an adsorbent and a diorganyldithiophosphoric acid ester, the crude wet-processed phosphoric acid being contacted either with a mixture consisting of the adsorbent and ester or, after treatment with the ester, with the adsorbent alone. Next, the phosphoric acid so purified is separated from the ester and adsorbent.

The adsorbents which should preferably be used comprise active carbon, carbon black, porous resins or silicates, especially zeolites; the diorganyldithiophosphoric acid esters preferably correspond to the general formula $(RO)_2PSSH$, in which R stands for substituted or unsubstituted alkyl, cycloalkyl, alkylaryl, aryl or aralkyl groups having from 1 to 24 carbon atoms, preferably 4 to 18 carbon atoms.

The phosphoric acid should preferably be contacted with the ester and adsorbent at temperatures between 10° and 100° C.

The mixture consisting of adsorbent and ester can be produced best by impregnating the adsorbent with a liquid ester, esters which are solid at room temperaturem, being fused. The mixtures are solid and flowable. As a result, it is possible for the acid to be easily separated from the mixture by decantation, filtration or flocculation.

It is however also possible for the diorganyldithiophosphoric acid ester and adsorbent to be successively added to the phosphoric acid. After such treatment, the solid matter mixture is allowed to deposit and supernatant phosphoric acid is separated therefrom in the manner described.

The proportions of dithioester and adsorbent used may vary within wide limits, but it is good practice for them to be kept as low as possible for reasons of cost.

The ratio of ester to adsorbent can be determined e.g. on the evidence of the maximum liquid adsorption of the adsorbent, but use can also be made of a load lower than maximum.

The proportions of active substance to be used vary with the origin of the crude acid and should preferably be determined individually in preliminary tests.

It is generally sufficient for the ester to be used in a 2 to 5 molar proportion, based on the heavy metal ions which are to be removed, and for the adsorbent to be used in a proportion of 0.05 to 1 weight %, based on the quantity of phosphoric acid.

As already mentioned above, it is possible for the feed material used in the process of this invention to be crude wet-processed phosphoric acid containing 3 to 80 weight % of $P_2O_5$ and 0.02 to 0.8 weight % organic substances, based on $P_2O_5$ and calculated as organically combined carbon.

The acids which are most frequently used commercially are those which contain about 30 and about 52% $P_2O_5$, respectively. As a result of the different densities and viscosities, it may be sufficient for the acid of lower concentration to be decanted whilst the acid of higher concentration should preferably be filtered.

Useful adsorbents are all those substances which are capable of tenaciously adsorbing at their surface a sufficiently large quantity of diorganyldithiophosphoric acid ester so that the quantity of dissolved emulsified thioester retained in the phosphoric acid after removal of the heavy metals therefrom is practically zero. Useful adsorbents are more particularly, for example: powdered or particulate active carbon or carbon black such as obtained upon subjecting acetylene to pyrolysis, or heavy oil to gasification under pressure in the presence of oxygen-containing gases. Silicates, especially aluminosilicates, such as zeolites, have proved particularly useful.

In the event of the thioester and adsorbent being successively added, it is good practice for the adsorbent and thioester to be used practically in identical quantities. Once again it is good practice for the particular quantity of adsorbent needed to be determined individually so as to ensure that the purified phosphoric acid is free from thioester residues.

A further preferred feature of the present invention provides for use to be made of the percolation technique, which provides for a coarse-grained adsorbent, e.g. particulate active carbon or compacted carbon black, to be impregnated with a liquid diorganyldithiophosphoric acid ester and for the resulting mixture to be placed in a column. Next, the phosphoric acid which is to be purified is passed through the adsorber bed, cadmium and other metals being retained on the column. The adsorber bed can be regenerated by stripping it, e.g. with concentrated hydrochloric acid.

In short, the present process offers the following technically beneficial effects:

(1) Black unpretreated crude phosphoric acid of almost any desired $P_2O_5$-concentration can be purified.
(2) It is possible for the purification to be effected as a simple one-step operation; subjecting the phosphoric acid to after-treatment, e.g. to stripping treatment, is unnecessary.
(3) The reagents need be used in minor proportions only; especially the diorganyldithiophosphoric acid ester can be used in proportions insignificantly higher than the quantity needed for the removal of the corresponding cations.
(4) By subjecting the crude phosphoric acid to the treatment with the adsorbent, which effects the deconcentration of organic contaminants, the acid becomes qualitatively improved.

The following Examples illustrate the invention:

EXAMPLES 1-7

The solid granular mixtures referred to in Table 1 hereinafter were made by kneading solid adsorbent and liquid or fused diorganyldithiophosphoric acid ester. Crude phosphoric acid containing 30% $P_2O_5$ (Examples 1-6=Khouribga phosphate-based phosphoric acid containing 16 ppm Cd, 33 ppm Cu, 0.1 ppm Pb, 0.005 ppm Hg, 350 ppm $C_{org}$; Example 7=Florida phosphate-based phosphoric acid containing 8 ppm Cd, 12 ppm Cu, 0.2 ppm Pb, 0.014 ppm Hg and 1000 ppm $C_{org}$.) was in each case mixed while stirring with the quantity of mixture necessary to establish the thioester percentages indicated in the Table, based on the total quantity of acid. After stirring for 15 minutes at room temperature, the whole was filtered with the use of a pressure filter (pore size=$8\mu$) and the Cd, Cu, Pb, Hg and $C_{org}$. contents in the filtrate were determined; in each case, less than 0.05 ppm Pb and 0.001 ppm Hg were determined.

EXAMPLES 8-12

Black Khouribga phosphate-based crude phosphoric acid (Examples 8-11) and black Florida phosphate-based crude phosphoric acid (Example 12) were mixed while stirring for 15 minutes with the quantities of dialkyldithiophosphoric acid indicated in Table 2. Next, the quantity of adsorbent indicated in Table 2 was stirred into the mixture within 15 minutes and the whole was then filtered using a membrane pressure filter. The clear filtrate was found to contain cadmium, copper, lead, mercury and organic carbon. The Cd content was less than 0.05 ppm and the Hg content was 0.001 ppm in each particular case.

EXAMPLE 13

Granular active carbon was impregnated with 71 weight % di-2-(ethylhexyl)dithiophosphoric acid and the mixture was placed in a glass column 30 cm high and 3 cm wide. Morocco phosphate-based crude phosphoric acid containing 30% $P_2O_5$ (16 ppm Cd) was allowed to drop through the column at a dropping velocity of about 1 bed volume/hour and the cadmium content in the effluent matter was determined after 0.5 liter, 1 liter, 1.5 liters and 2 liters, respectively, had been dropped through. It was less than 1 ppm Cd in each particular case.

Active carbon which had the following BET-surface areas were used in the Examples:
Examples 3 and 13: 1000-1100 $m^2/g$
Examples 8, 9, 10 and 12: more than 1500 $m^2/g$

TABLE 1

| Ex. | Adsorbent | R in $(RO)_2PS_2H$ | % $(RO)_2PS_2H$ in active substance mixture | % thioester / phosphoric acid | ppm in filtrate | | | deconcentration $C_{org.}$ |
|---|---|---|---|---|---|---|---|---|
| | | | | | Cd | Cu | $C_{org.}$ | |
| 1 | carbon black* 1500-2000° C. | 2-ethylhexyl | 22.5 | 0.3 | <1 | <1 | 130 | 63% |
| 2 | carbon black* 500-700° C. | phenyl | 80.5 | 0.3 | 3 | <1 | 200 | 43% |
| 3 | active carbon powder | phenyl | 62.8 | 0.3 | 3 | <1 | 240 | 22% |
| 4 | carbon black* 1500-2000° C. | phenyl | 55.6 | 0.4 | 4 | 1 | 240 | 22% |
| 5 | acetylene carbon black | 2-ethylhexyl | 42.4 | 0.4 | 3 | 1 | 160 | 55% |
| 6 | zeolite A | 2-ethylhexyl | 18.7 | 0.2 | <1 | <1 | 150 | 47% |
| 7 | carbon black* 1500-2000° | 2-ethylhexyl | 22.5 | 0.3 | <1 | <1 | 640 | 46% |

*The term "carbon black" is used herein to define a product obtained by subjecting heavy oil to gasification under pressure in the presence of oxygen-containing gases and thermally after-treated at the temperature specified

TABLE 2

| Ex. | Adsorbent | R in $(RO)_2PS_2H$ | % $P_2O_5$ in crude acid | % thioester/ phosphoric acid | % adsorbent/ $H_3PO_4$ | ppm in filtrate | | | deconcentration $C_{org.}$ |
|---|---|---|---|---|---|---|---|---|---|
| | | | | | | Cd | Cu | $C_{org.}$ | |
| 8 | active carbon powder | 2-ethylhexyl | 30 | 0.2 | 0.1 | <1 | <1 | 80 | 77% |
| 9 | active carbon powder | n-$C_{14}$ | 30 | 0.2 | 0.1 | 2 | <1 | 100 | 65% |
| 10 | active carbon powder | 2-ethylhexyl | 52 | 0.2 | 0.2 | 2 | <1 | 180 | 49% |

TABLE 2-continued

| Ex. | Adsorbent | R in $(RO)_2PS_2H$ | % $P_2O_5$ in crude acid | % thioester/ phosphoric acid | % adsorbent/ $H_3PO_4$ | Cd | Cu | $C_{org.}$ | deconcentration $\frac{C_{org.}}{C_{org.}}$ |
|---|---|---|---|---|---|---|---|---|---|
| 11 | carbon black* 500–700° C. | 2-ethylhexyl | 30 | 0.2 | 0.1 | <1 | <1 | 50 | 86% |
| 12 | active carbon powder | 2-ethylhexyl | 30 | 0.2 | 0.2 | <1 | <1 | 490 | 51% |

*The term "carbon black" is used herein to define a product obtained by subjecting heavy oil to gasification under pressure in the presence of oxygen-containing gases and thermally after-treated at the temperature specified.

We claim:

1. A process for removing ions of cadmium, copper, lead and mercury from crude wet-process phosphoric acid containing dissolved, emulsified or suspended organic substances by contacting the crude wet-process phosphoric acid with an adsorbent and an ester of dithiophosphoric acid, simultaneously and separating the purified phosphoric acid from the ester and adsorbent said adsorbent being selected from active carbon, carbon black, a porous resin, or silicate.

2. The process as claimed in claim 1, wherein the ester of dithiophosphoric acid used has the general formula $(RO)_2PSSH$, in which R stands for a substituted or unsubstituted alkyl, cycloalkyl, alkylaryl, aryl or aralkyl group having from 1 to 24 carbon atoms.

3. The process as claimed in claim 1, wherein the phosphoric acid is contacted with the ester and adsorbent at temperatures between 10° and 100° C.

4. The process as claimed in claim 1, wherein the ester is used in a 2 to 5 molar proportion, based on the said metal ions to be removed.

5. The process as claimed in claim 1, wherein the adsorbent is used in a proportion of 0.05 to 1 weight %, based on the quantity of phosphoric acid.

6. The process as claimed in claim 1, wherein the feed material is crude wet-process phosphoric acid containing 3 to 80 weight % $P_2O_5$ and calculated as organically combined carbon.

7. The process as claimed in claim 1, wherein the phosphoric acid is contacted simultaneously with the ester and the adsorbent by impregnating the adsorbent with the ester in liquid form before using it.

8. The process as claimed in claim 7, wherein the adsorbent is impregnated with a molten ester which is solid at room temperature.

* * * * *